US012222575B2

(12) United States Patent
Murakoshi et al.

(10) Patent No.: US 12,222,575 B2
(45) Date of Patent: Feb. 11, 2025

(54) INTERMITTENTLY CONNECTED OPTICAL FIBER RIBBON

(71) Applicant: Fujikura Ltd., Tokyo (JP)

(72) Inventors: Yoshie Murakoshi, Chiba (JP); Akira Namazue, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 18/397,026

(22) Filed: Dec. 27, 2023

(65) Prior Publication Data

US 2024/0134140 A1 Apr. 25, 2024
US 2024/0231029 A9 Jul. 11, 2024

Related U.S. Application Data

(63) Continuation of application No. 17/632,681, filed as application No. PCT/JP2020/018938 on May 12, 2020, now Pat. No. 11,899,266.

(30) Foreign Application Priority Data

Aug. 21, 2019 (JP) ................................ 2019-151467

(51) Int. Cl.
*G02B 6/44* (2006.01)
(52) U.S. Cl.
CPC .......... *G02B 6/448* (2013.01); *G02B 6/4403* (2013.01)
(58) Field of Classification Search
CPC .............................. G02B 6/448; G02B 6/4403
USPC ........................................................ 385/114
See application file for complete search history.

(56) References Cited

U.S. PATENT DOCUMENTS

2018/0031792 A1 2/2018 Risch et al.
2019/0250347 A1 8/2019 Fallahmohammadi et al.

FOREIGN PATENT DOCUMENTS

| CN | 106030364 A | 10/2016 | |
|---|---|---|---|
| CN | 108351273 A | 7/2018 | |
| CN | 108369324 A | 8/2018 | |
| CN | 108474921 A | 8/2018 | |
| CN | 109642999 A | 4/2019 | |
| EP | 3470900 A1 | 4/2019 | |
| JP | H10288726 A | * 10/1998 | ............... G02B 6/44 |
| JP | 2007-232956 A | 9/2007 | |
| JP | 2009-237480 A | 10/2009 | |
| JP | 2016-001338 A | 1/2016 | |
| JP | 2018-010238 A | 1/2018 | |

(Continued)

OTHER PUBLICATIONS

International Search Report issued in corresponding International Application No. PCT/JP2020/018938 mailed Aug. 18, 2020 (6 pages).

(Continued)

*Primary Examiner* — Jerry M Blevins
(74) *Attorney, Agent, or Firm* — Osha Bergman Watanabe & Burton LLP

(57) ABSTRACT

An optical fiber ribbon includes: optical fibers disposed side by side in a predetermined direction; and connecting portions that connect two adjacent ones of the optical fibers. A peripheral resin portion is formed on a periphery of the optical fibers. An arithmetic mean roughness Ra of a surface of the peripheral resin portion is 0.41 μm or lower. A ten-point mean roughness Rz of a surface of the peripheral resin portion is 1.4 μm or lower.

18 Claims, 6 Drawing Sheets

(56) References Cited

FOREIGN PATENT DOCUMENTS

WO         2017/094560 A1     6/2017
WO     WO-2019069537 A1 *   4/2019   ............... G02B 6/44

OTHER PUBLICATIONS

Examination Report issued in counterpart Austalian Patent Application No. 2020332113 mailed on Sep. 29, 2023 (5 pages).
"Optics and photonics—Preparation of drawings for optical elements and systems—Part 8: Surface texture; roughness and waviness"; International Standard, ISO 10110-8, Second edition; Oct. 1, 2010 (11 pages).
John A. Jay, "Optical fiber design to improve microbending resistance", Lightwave, May/Jun. 2011 (4 pages).
Surface Roughness Tester Surtronic Duo II | Surface Roughness Measurement, Viewed on Internet <URL: https://www.youtube.com/watch?v=bjcAhQI-xpU>, Published Aug. 12, 2015.
Surface Roughness JIS B 0601 (1994), pp. 3541-3542 (1 page).
Examination Report issued in counterpart Australian Patent Application No. 2020332113 mailed on Jan. 23, 2024 (4 pages).

\* cited by examiner

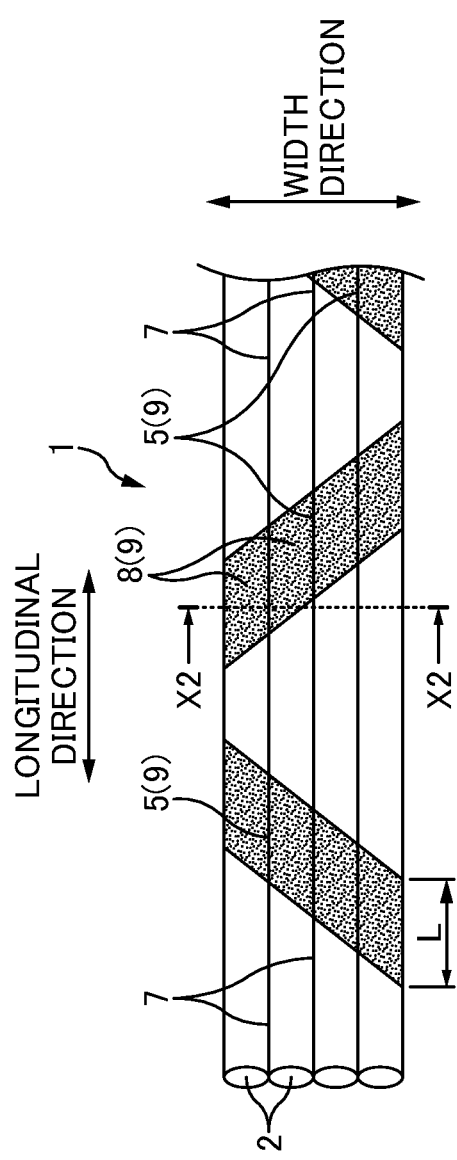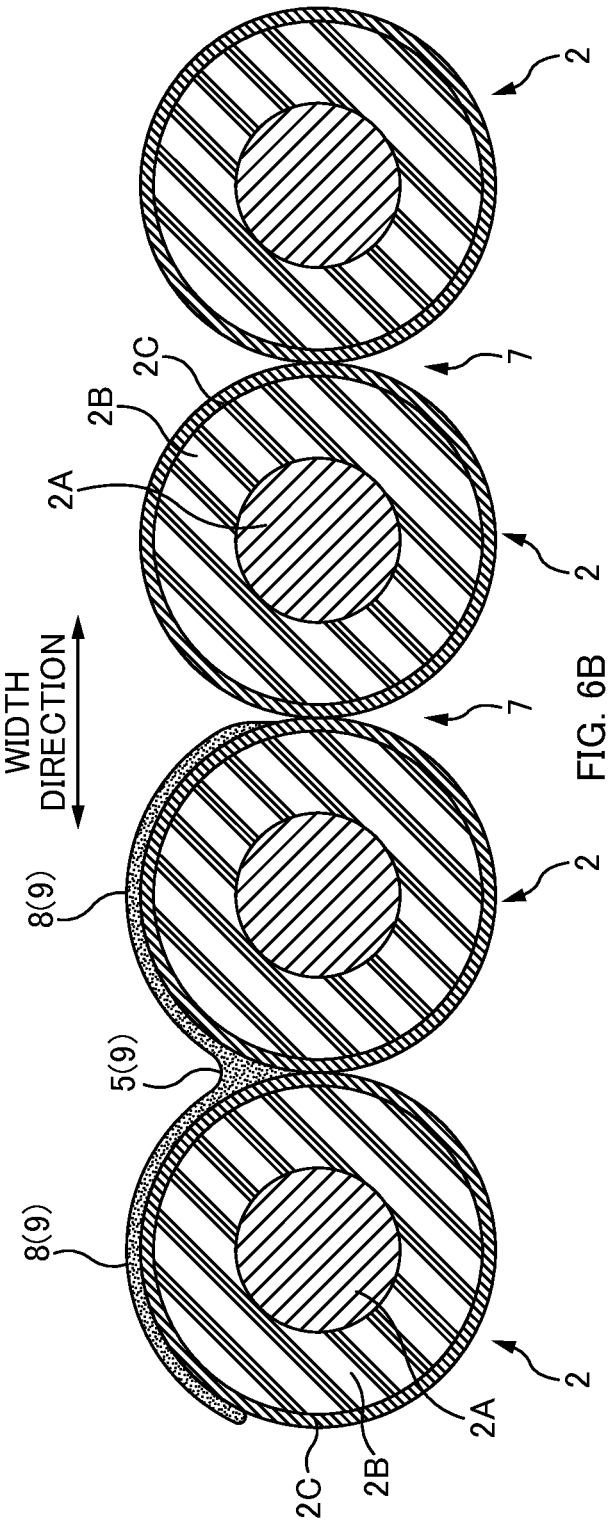

INTERMITTENTLY CONNECTED OPTICAL FIBER RIBBON

TECHNICAL FIELD

The present invention relates to an intermittently connected optical fiber ribbon.

BACKGROUND

Patent Literatures 1 to 3 describe an optical fiber ribbon including multiple optical fibers. Additionally, Patent Literatures 2 and 3 describe an optical fiber ribbon (intermittently connected optical fiber ribbon) in which three or more optical fibers in parallel are intermittently connected.

CITATION LIST

Patent Literature

PTL 1: Japanese Patent Application Publication No. 2009-237480
PTL 2: Japanese Patent Application Publication No. 2016-1338
PTL 3: Japanese Patent Application Publication No. 2018-102358

As described in PTL 1, an optical fiber ribbon (a collective coating type optical fiber ribbon) in which multiple optical fibers are coated collectively has a structure that prevents a lateral pressure onto the optical fibers, and therefore it is possible to inhibit the microbending loss in the optical fibers. In contrast, the inventor of this application found out that, in a case of an intermittently connected optical fiber ribbon as described in PTLs 2 and 3, the microbending loss in the optical fibers is increased under predetermined conditions.

SUMMARY

One or more embodiments of the present invention provides an intermittently connected optical fiber ribbon that is capable of inhibiting the microbending loss.

One or more embodiments of the invention is an intermittently connected optical fiber ribbon, comprising: a plurality of optical fibers arranged in a predetermined direction; and connecting portions that intermittently connect two adjacent ones of the optical fibers, wherein a peripheral resin portion is formed on a periphery of the optical fibers, and an arithmetic mean roughness Ra of a surface of the peripheral resin portion is 0.41 µm or lower.

Other features of embodiments of the present invention will be demonstrated by the description to be given below and by the drawings.

One or more embodiments of the present invention can inhibit the microbending loss.

BRIEF DESCRIPTION OF DRAWINGS

FIG. 6A is a diagram illustrating an intermittently connected optical fiber ribbon 1 according to one or more embodiments. FIG. 6B is a sectional view taken along X2-X2 in FIG. 6A.

DETAILED DESCRIPTION

At least the following matters are disclosed from the descriptions of the following specification and drawings.

An intermittently connected optical fiber ribbon will become clear, comprising: a plurality of optical fibers arranged in a predetermined direction; and connecting portions that intermittently connect two adjacent ones of the optical fibers, wherein a peripheral resin portion is formed on a periphery of the optical fibers, and an arithmetic mean roughness Ra of a surface of the peripheral resin portion is 0.41 µm or lower. According to such an intermittently connected optical fiber ribbon, it is possible to inhibit the microbending loss.

An intermittently connected optical fiber ribbon will become clear, comprising: a plurality of optical fibers arranged in a predetermined direction; and connecting portions that intermittently connect two adjacent ones of the optical fibers, wherein a peripheral resin portion is formed on a periphery of the optical fibers, and a maximum height Ry of a surface of the peripheral resin portion is 2.0 µm or lower. According to such an intermittently connected optical fiber ribbon, it is possible to inhibit the microbending loss.

An intermittently connected optical fiber ribbon will become clear, comprising: a plurality of optical fibers arranged in a predetermined direction; and connecting portions that intermittently connect two adjacent ones of the optical fibers, wherein a peripheral resin portion is formed on a periphery of the optical fibers, and a ten-point mean roughness Rz of a surface of the peripheral resin portion is 1.4 µm or lower. According to such an intermittently connected optical fiber ribbon, it is possible to inhibit the microbending loss.

An intermittently connected optical fiber ribbon will become clear, comprising: a plurality of optical fibers arranged in a predetermined direction; and connecting portions that intermittently connect two adjacent ones of the optical fibers, wherein a peripheral resin portion is formed on a periphery of the optical fibers, and a root mean square height Rq of a surface of the peripheral resin portion is 0.42 µm or lower. According to such an intermittently connected optical fiber ribbon, it is possible to inhibit the microbending loss.

It is desirable that the peripheral resin portion is formed of resin forming the connecting portions. With this, it is possible to form a peripheral resin portion and a connecting portion from the same resin.

It is desirable that a silicone compound is added to the resin. Since a surface of the optical fiber ribbon 1 may be rough when an intermittently connected optical fiber ribbon is manufactured by using resin to which a silicone compound is added, it is particularly desirable in such a case to set the surface roughness of the peripheral resin portion to be a predetermined value or lower.

<Intermittently Connected Optical Fiber Ribbon>

Figure 1:
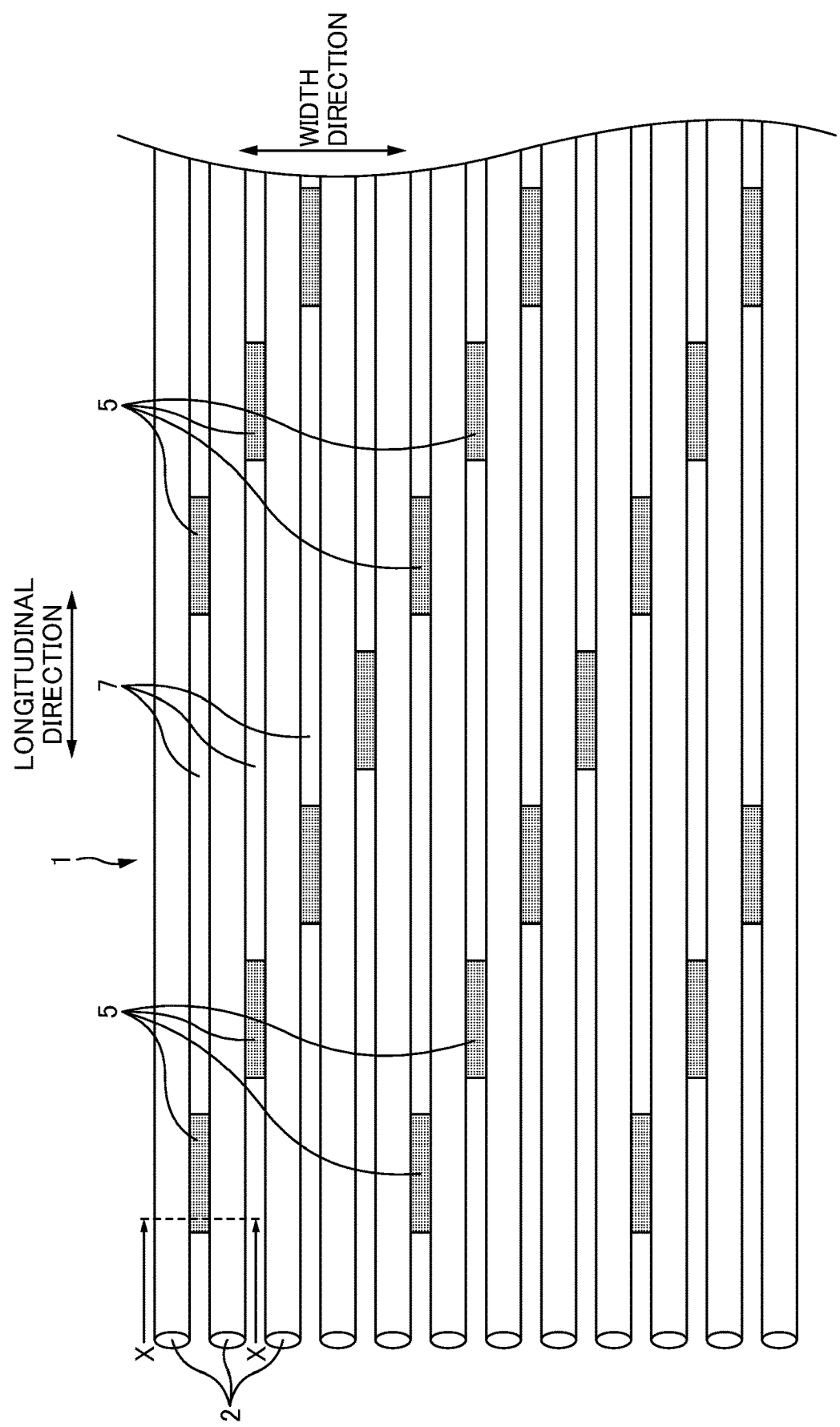
FIG. 1 is a diagram illustrating an intermittently connected optical fiber ribbon 1 in which single fibers are intermittently connected to one another according to one or more embodiments.

FIG. 1 is a diagram illustrating an intermittently connected optical fiber ribbon 1 in which single fibers are intermittently connected to one another.

The intermittently connected optical fiber ribbon 1 is an optical fiber ribbon in which a plurality of optical fibers 2 are arranged side by side and intermittently connected together. Two adjacent optical fibers 2 are connected by connecting portions 5. The plurality of connecting portions that connect two adjacent optical fibers 2 are disposed intermittently in the longitudinal direction. The plurality of connecting portions 5 in the intermittently connected optical fiber ribbon 1 are intermittently disposed two-dimensionally in the longitudinal direction and the ribbon width direction. The connecting portions 5 are formed by applying an ultraviolet light curable resin (a coupling agent) to serve as an adhesive and then curing the resin by application of ultraviolet light. Note that it is also possible to form the connecting portions 5 with a thermoplastic resin. A non-connecting portion 7 is formed between the connecting portion 5 and the connecting portion 5 that are intermittently formed in the longitudinal direction. In other words, the connecting portion 5 and the non-connecting portion 7 are alternately disposed in the longitudinal direction. At the non-connecting portion 7, two adjacent optical fibers are not bound to each other. The non-connecting portion 7 is disposed in the ribbon width direction relative to a position where the connecting portion 5 is formed. This makes it possible to roll the optical fiber ribbon 1 into a bundle and therefore possible to house a large number of optical fibers 2 in an optical cable with high density.

Figure 2:
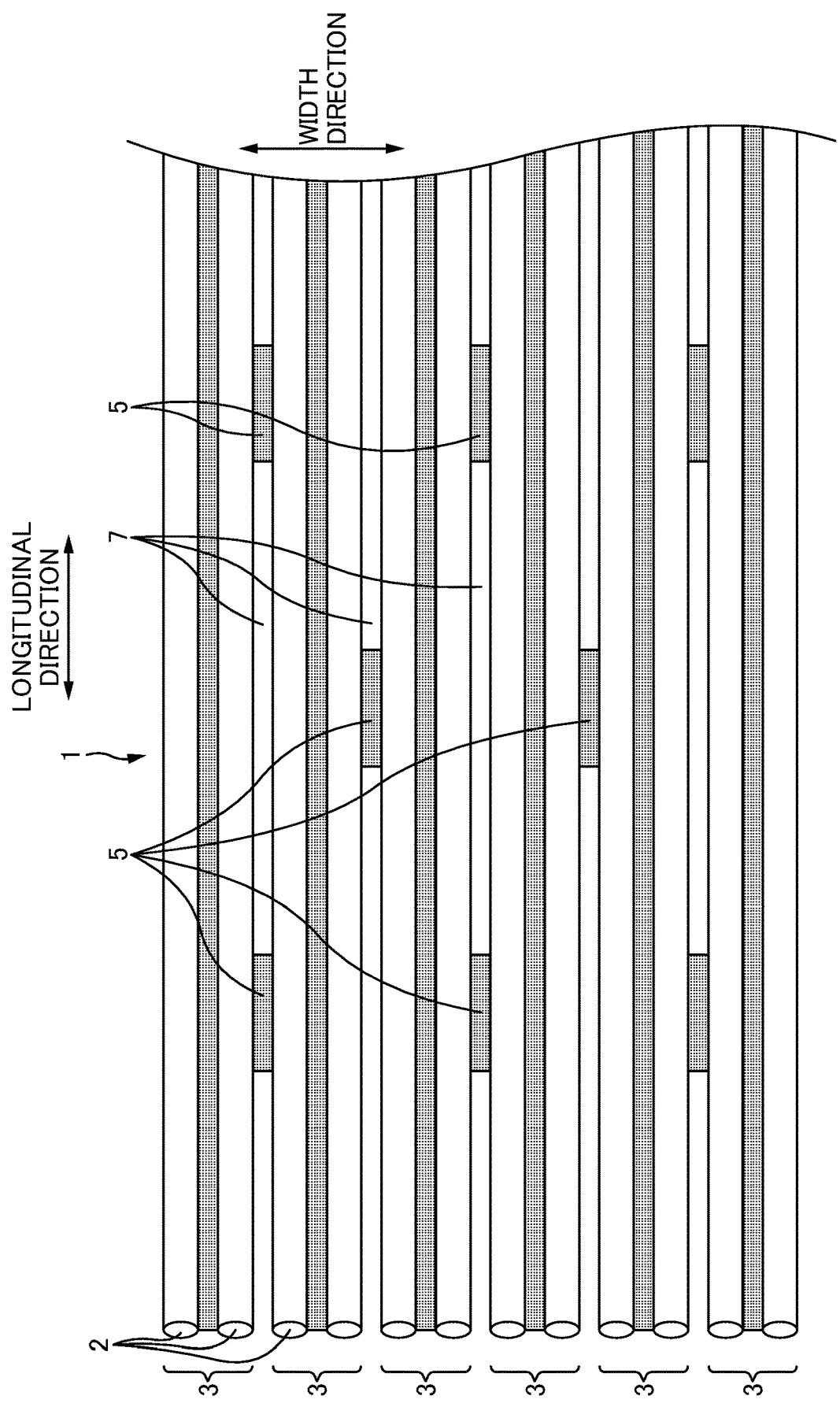
FIG. 2 is a diagram illustrating a different intermittently connected optical fiber ribbon 1.

FIG. 2 is a diagram illustrating a different intermittently connected optical fiber ribbon 1. This optical fiber ribbon 1 includes a plurality of (six here) pairs of two optical fibers 2 connected together continuously in the longitudinal direction (fiber pairs 3), and adjacent fiber pairs 3 are connected together intermittently with the connecting portions 5. In this intermittently connected optical fiber ribbon 1 as well, the non-connecting portion 7 is disposed in the ribbon width direction of a position where the connecting portion 5 is formed. This makes it possible to roll the optical fiber ribbon 1 into a bundle. Also, in this intermittently connected optical fiber ribbon 1 as well, the plurality of connecting portions 5 connecting adjacent fiber pairs 3 are disposed intermittently in the longitudinal direction, and the non-connecting portion 7 is formed between the connecting portion 5 and the connecting portion 5. In other words, in this intermittently connected optical fiber ribbon 1 as well, the connecting portion 5 and the non-connecting portion 7 are alternately disposed in the longitudinal direction.

Note that the intermittently connected optical fiber ribbon 1 is not limited to the ones shown in FIGS. 1 and 2. For example, the arrangement of the connecting portions 5 may be changed, or the number of optical fibers 2 may be changed.

Figure 3:
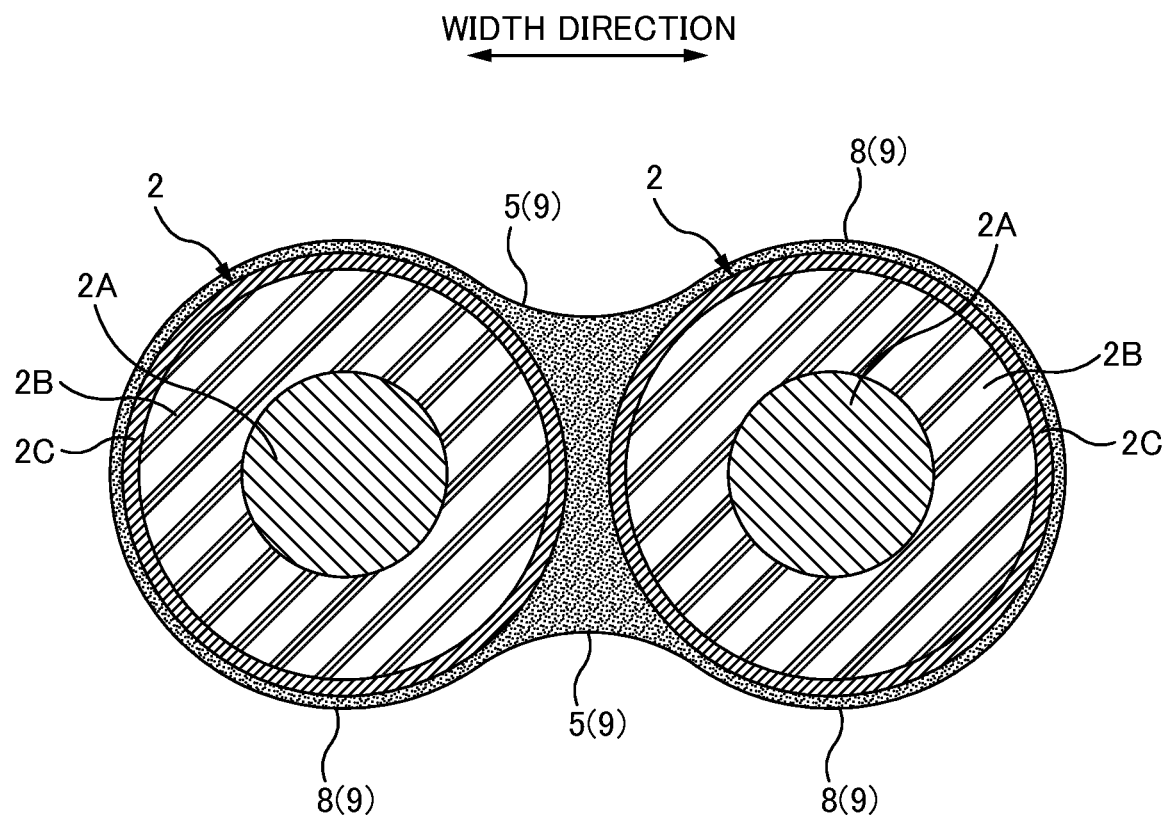
FIG. 3 is a sectional view taken along X-X in FIG. 1.

FIG. 3 is a sectional view taken along X-X in FIG. 1.

Each optical fiber 2 is formed by an optical fiber bare wire 2A, a coating layer 2B, and a colored layer 2C. The optical fiber bare wire 2A is formed by a core and a cladding. The coating layer 2B is a layer coating the optical fiber bare wire 2A. The coating layer 2B includes, for example, a primary coating layer (primary coating) and a secondary coating layer (secondary coating). Note that, the Young's modulus of the primary coating layer is 0.4 to 0.8 MPa, and the outer diameter thereof is 150 to 160 µm, while the Young's modulus of the secondary coating layer is 900 to 1300 MPa, and the outer diameter thereof is 190 to 200 µm. The colored layer 2C is a layer formed on a surface of the coating layer 2B. The colored layer 2C is formed by applying a colorant on the surface of the coating layer 2B. A marking may be formed between the coating layer 2B and the colored layer 2C. The Young's modulus of the colored layer 2C is 850 to 950 MPa, and the outer diameter thereof is 200 to 210 µm. Note that, the colored layer 2C and a marking may not be formed on the outer side of the coating layer 2B (that is, the optical fiber 2 may be formed of the optical fiber bare wire 2A and the coating layer 2B).

Between the two optical fibers 2, the connecting portion 5 is formed by applying and curing the coupling agent (ultraviolet-curing resin). In one or more embodiments, the coupling agent (ultraviolet-curing resin) is applied and cured also on a surface of the colored layer 2C of the optical fiber 2. In the following descriptions, the resin (in this case, the cured coupling agent) formed on the periphery of the optical fiber 2 (in this case, the periphery of the colored layer 2C) may be referred to as a "peripheral resin portion 8." Additionally, the connecting portion 5 (the cured coupling agent) and the peripheral resin portion 8 may be collectively referred to as a "ribbon forming material portion 9."

Note that, in one or more embodiments, the peripheral resin portion 8 is formed of the resin (the coupling agent) forming the connecting portion 5. However, as long as the peripheral resin portion 8 is resin formed on the periphery of the optical fiber 2, the peripheral resin portion 8 may be formed of resin other than the resin (the coupling agent) forming the connecting portion 5.

Additionally, in one or more embodiments, the peripheral resin portion 8 is formed on the entire periphery of the optical fiber 2. However, the peripheral resin portion 8 may not be formed on the entire periphery of the optical fiber 2 and may be formed on a part of the periphery of the optical fiber 2.

Moreover, in one or more embodiments, the peripheral resin portion 8 is formed on the entire area of the optical fiber 2 in the longitudinal direction. However, the peripheral resin portion 8 may not be formed on the entire area of the optical fiber 2 in the longitudinal direction and may be formed on a part of the optical fiber 2 in the longitudinal direction.

Figure 4A:
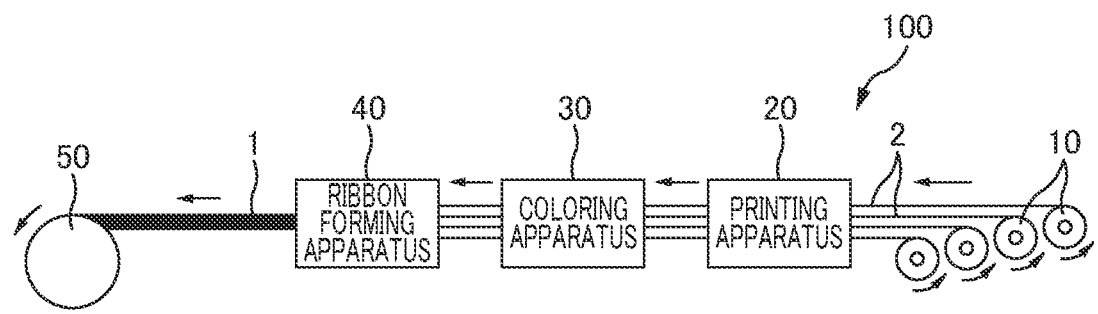
FIG. 4A is a diagram illustrating a manufacturing system 100 for manufacturing the intermittently connected optical fiber ribbon 1.

FIG. 4A is a diagram illustrating a manufacturing system 100 for manufacturing the intermittently connected optical fiber ribbon 1. For the simplification of the drawing, the manufacturing system 100 described here manufactures a four-fiber optical fiber ribbon.

The manufacturing system 100 has fiber supply devices 10, a printing apparatus 20, a coloring apparatus 30, a ribbon forming apparatus 40, and a bobbin 50.

The fiber supply devices 10 are devices (supply sources) that supply the optical fibers 2. Here, the fiber supply device 10 supplies a single optical fiber 2 (an optical fiber formed by the optical fiber bare wire 2A and the coating layer 2B; an optical fiber before the formation of the colored layer 2C). Alternatively, the fiber supply device 10 may supply a pair of two optical fibers 2 (the fiber pair 3). The fiber supply device 10 supplies the optical fiber 2 to the printing apparatus 20.

The printing apparatus 20 is an apparatus that prints a mark on the optical fiber 2. For example, the printing apparatus 20 prints a mark indicative of a ribbon number on each optical fiber 2. The plurality of optical fibers 2 marked by the printing apparatus 20 are supplied to the coloring apparatus 30.

The coloring apparatus 30 is an apparatus that forms the colored layers 2C of the optical fibers 2. The coloring apparatus 30 forms the colored layer 2C on each of the optical fibers 2 with an identification color for identification of the optical fiber 2. Specifically, the coloring apparatus 30 has coloring devices (not shown) for the respective optical fibers 2, and the coloring devices each apply a coloring agent (ultraviolet light curable resin) of a predetermined identification color to the surface of the corresponding optical fiber 2 (the surface of the coating layer 2B). The coloring apparatus 30 also has an ultraviolet light irradiation device (not shown), and the ultraviolet light irradiation device applies ultraviolet light to the coloring agent (the ultraviolet light curable resin) applied to each optical fiber 2 and cures the coloring agent, thereby forming the colored layer 2C. The optical fibers 2 colored by the coloring apparatus 30 are supplied to the ribbon forming apparatus 40. Alternatively, the colored optical fibers 2 may be supplied to the ribbon forming apparatus 40 from the fiber supply devices 10.

Figure 4B:
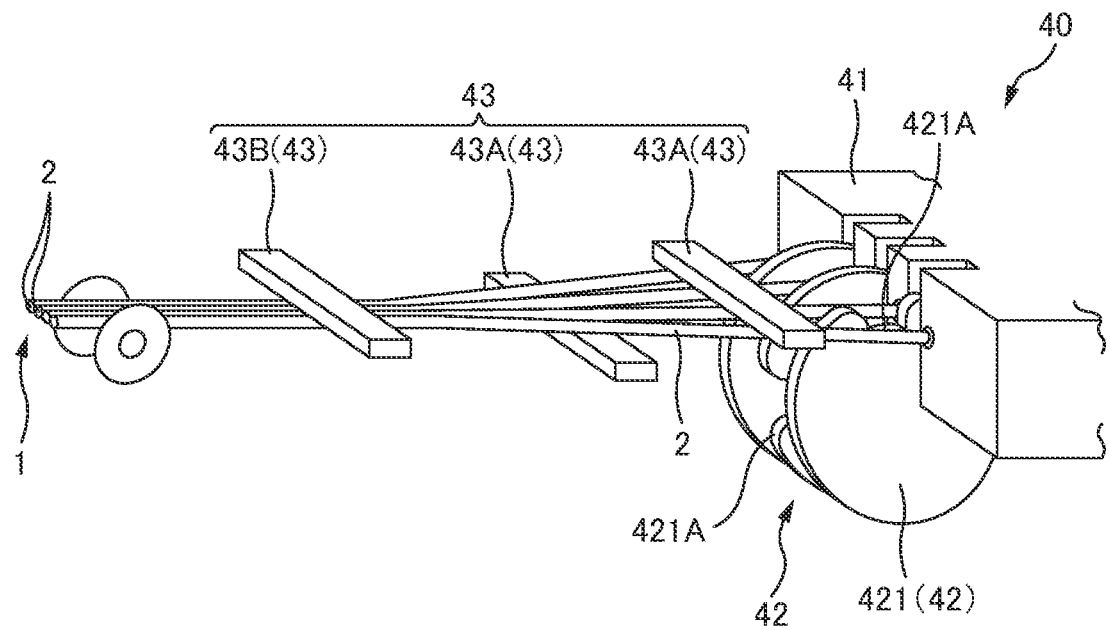
FIGS. 4B and 4C are diagrams illustrating a ribbon forming apparatus 40. The ribbon forming apparatus 40 includes an application device 41, a removal device 42, and a light source 43.
Figure 4C:
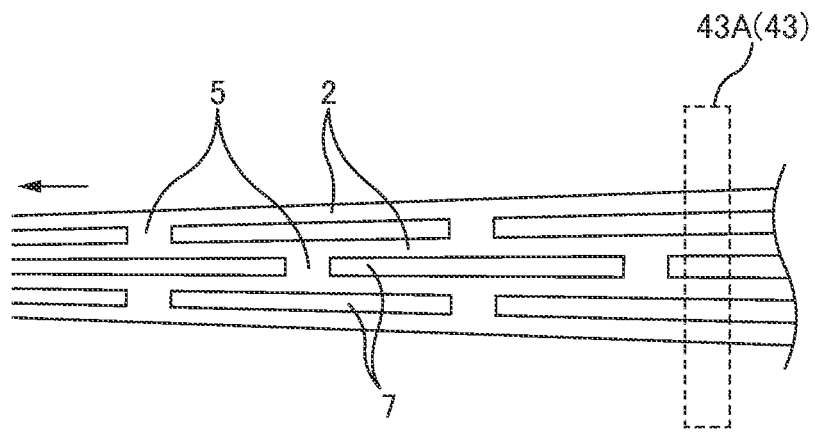

The ribbon forming apparatus 40 is an apparatus that manufactures the intermittently connected optical fiber ribbon 1 by forming the connecting portions 5 intermittently. Supplied to the ribbon forming apparatus 40 are the plurality of optical fibers 2 arranged in the width direction. FIGS. 4B and 4C are diagrams illustrating the ribbon forming apparatus 40. The ribbon forming apparatus 40 has an application device 41, a removal device 42, and light sources 43.

The application device 41 is a device that applies a coupling agent. The coupling agent is, for example, an ultraviolet light curable resin, and the connecting portion 5 is formed by curing of the coupling agent. The application device 41 applies the coupling agent in liquid form to the outer circumferences of the optical fibers 2 and to between adjacent ones of the optical fibers 2 continuously in the longitudinal direction by inserting the plurality of optical fibers 2 through coating dies filled with the liquid coupling agent. Note that, in one or more embodiments, a silicone compound is added to the ultraviolet-curing resin forming the coupling agent in liquid form. Use of the coupling agent in which the silicone compound is added to the ultraviolet-curing resin makes it easy to remove the peripheral resin portion 8 from the optical fiber 2 and makes it easy to perform the single fiber separation of the optical fibers 2 from the intermittently connected optical fiber ribbon 1.

The removal device 42 is a device that removes part of the coupling agent applied by the application device 41 while leaving part thereof. The removal device 42 has rotary blades 421 each with a recessed portion 421A (see FIG. 4B), and rotates the rotary blades 421 in conformity with the speed at which the optical fibers 2 are supplied. While the coupling agent applied by the application device 41 is removed by being blocked by the outer edges of the rotary blades 421, the coupling agent is left unremoved at the recessed portions 421A of the rotary blades 421. The part of the coupling agent left unremoved serves as the connecting portion 5 (see FIG. 1), and the part of the coupling agent removed serves as the non-connecting portion 7. Thus, the length and arrangement of the connecting portions 5 can be adjusted by adjustment of the rotation speed of the rotary blade 421 and the size of the recessed portion 421A.

The light sources 43 are devices that apply ultraviolet light to the coupling agent formed of the ultraviolet light curable resin. The light sources 43 have temporary curing light sources 43A and a full curing light source 43B. The temporary curing light sources 43A are disposed upstream of the full curing light source 43B. The coupling agent temporarily cures when irradiated with ultraviolet light by the temporary curing light sources 43A. The temporarily cured coupling agent is in a state of not being completely cured but being cured at the surface. The full curing light source 43B causes the coupling agent to cure fully by applying stronger ultraviolet light than the temporary curing light sources 43A. The fully cured ultraviolet light curable resin is in a state of being cured all the way through (although the fully cured coupling agent (the connecting portion 5) is moderately elastic, so that the intermittently connected optical fiber ribbon 1 can be rolled into a tube).

As shown in FIG. 4C, the optical fibers 2 immediately out of the application device 41 and the removal device 42 are spaced apart from each other. In this state, the temporary curing light sources 43A apply ultraviolet light to the coupling agent to temporarily cure the coupling agent. After the temporary curing of the coupling agent, the ribbon forming apparatus 40 gradually narrows the gaps between the optical fibers 2 and arrange the plurality of optical fibers 2 side by side, concentrating them into a ribbon form. The coupling agent is already temporarily cured; thus, even if the parts where the coupling agent has been removed (the non-connecting portions 7) come into contact with each other, they do not become connected together. Also, because the coupling agent is yet to be fully cured, the optical fibers 2 can be narrowed in gaps (concentrated) even at the regions connected with the coupling agent. Once the coupling agent cures fully by being irradiated with ultraviolet light by the full curing light source 43B, the intermittently connected optical fiber ribbon 1 shown in FIG. 1A is manufactured. Note that, as long as it is possible to form the connecting portions 5 of the intermittently connected optical fiber ribbon 1 intermittently, the light source 43 is not limited to the one including two types of light sources, which are the light source for preliminary curing 43A and the light source for final curing 43B, and for example, the light source 43 may include one light source.

Note that, the above-described ribbon forming apparatus forms the connecting portions 5 and the non-connecting portions 7 of the intermittently connected optical fiber ribbon 1 by removing a part of the coupling agent applied by the application device 41 while leaving some parts. However, the method of intermittently forming the connecting portions 5 is not limited to this. For example, the ribbon forming apparatus may form the intermittently connected optical fiber ribbon 1 by, after applying the coupling agent so as to collectively coat the multiple optical fibers 1 and curing the coupling agent (that is, after once forming an optical fiber ribbon coated collectively), making a notch in the coupling agent cured between the optical fiber 1 and the optical fiber 1. Additionally, the ribbon forming apparatus 40 may form the intermittently connected optical fiber ribbon 1 by intermittently ejecting the coupling agent from a dispenser to the optical fibers and curing the coupling agent. Note that, in this case, the dispenser may apply the coupling agent from two sides of a ribbon surface of the optical fiber ribbon or may apply the coupling agent from one side of the ribbon surface. Moreover, the ribbon forming apparatus 40 may form the intermittently connected optical fiber ribbon by applying the coupling agent in the shape of a band as described later (see one or more embodiments described below) or may form the intermittently connected optical fiber ribbon by attaching a connecting ribbon in the shape of a band.

The bobbin 50 is a member that winds up the optical fiber ribbon 1 (see FIG. 4A). The optical fiber ribbon 1 manufactured by the ribbon forming apparatus 40 is wound up by the bobbin 50.

As described above, in one or more embodiments, during the manufacturing of the intermittently connected optical fiber ribbon 1, the application device 41 applies the coupling agent in liquid form on the periphery of the optical fiber 2 and between the adjacent optical fibers 2. Additionally, in one or more embodiments, the silicone compound is added to the ultraviolet-curing resin forming the coupling agent in liquid form. Use of the coupling agent in which the silicone compound is added to the ultraviolet-curing resin makes it easy to remove the ribbon forming material portion 9 (the connecting portion 5 between the optical fibers 2 and the cured coupling agent on the periphery of the optical fiber 2) from the optical fiber 2 and makes it easy to perform the single fiber separation of the optical fibers 2 from the intermittently connected optical fiber ribbon 1.

In the case where the intermittently connected optical fiber ribbon 1 is manufactured by using the coupling agent in which the silicone compound is added to the ultraviolet-curing resin, a surface of the optical fiber ribbon 1 may be rough if the compatibility between the ultraviolet-curing resin and the silicone compound is bad. The inventor of this application found out that, when a surface of the optical fiber ribbon 1 is rough as described above, the microbending loss is increased due to the irregularities formed on the surface of the optical fiber ribbon 1.

In order to inhibit the microbending loss in the optical fibers forming the intermittently connected optical fiber ribbon, the small irregularities on the surface of the optical fiber ribbon 1 (in other words, the small surface roughness of the peripheral resin portion 8 of the optical fiber 2) are desired. Specifically, in order to inhibit the microbending loss in the optical fibers forming the intermittently connected optical fiber ribbon, the arithmetic mean roughness Ra of the peripheral resin portion 8 of the optical fiber 2 is desired to be 0.41 μm or lower. Additionally, in order to inhibit the similar microbending loss, the maximum height Ry of the peripheral resin portion 8 of the optical fiber 2 is desired to be 2.0 μm or lower. Moreover, in order to inhibit the similar microbending loss, the ten-point mean roughness Rz of the peripheral resin portion 8 of the optical fiber 2 is desired to be 1.4 μm or lower. Furthermore, in order to inhibit the similar microbending loss, the root mean square height Rq of the peripheral resin portion 8 of the optical fiber 2 is desired to be 0.42 μm or lower. These points are described below.

<Arithmetic Mean Roughness Ra>

12-fiber intermittently connected optical fiber ribbons 1 illustrated in FIG. 1 was created according to the manufacturing method illustrated in FIGS. 4A to 4C. Note that, the outer diameter of the primary coating layer (primary coating) forming the coating layer 2B (see FIG. 3) is 150 to 160 μm, and the outer diameter of the secondary coating layer (secondary coating) is 190 to 200 μm. Additionally, the outer diameter of the colored layer 2C (see FIG. 3) is 200 to 210 μm. The Young's modulus is 850 to 950 MPa. Moreover, the Young's modulus of the primary coating layer in one or more embodiments is 0.4 to 0.8 MPa, and the Young's modulus of the secondary coating layer is 900 to 1300 MPa.

Additionally, multiple types of the 12-fiber intermittently connected optical fiber ribbons were created with different types of coupling agents. In this case, as indicated in Table 1 below, multiple types of the 12-fiber intermittently connected optical fiber ribbon were created by changing the Young's modulus of the coupling agent (the connecting portion 5, the peripheral resin portion 8, and the ribbon forming material portion 9) and the silicone compound added to the coupling agent. Note that, the Young's modulus of the coupling agent was measured by creating a sheet by irradiating the coupling agent (ultraviolet-curing resin) that is applied to have the film thickness of 200 μm with ultraviolet light of the illuminance of 500 mJ/cm 2 under a nitrogen-purged atmosphere, forming the sheet into the form of strip having the width of 10 mm so as to form a specimen, and measuring the modulus of elasticity of the specimen under the strain of 2.5%. The added amount of the silicone compound is measured by analyzing the Si ratio by SEM-EDS analysis of the coupling agent.

Figure 5A:
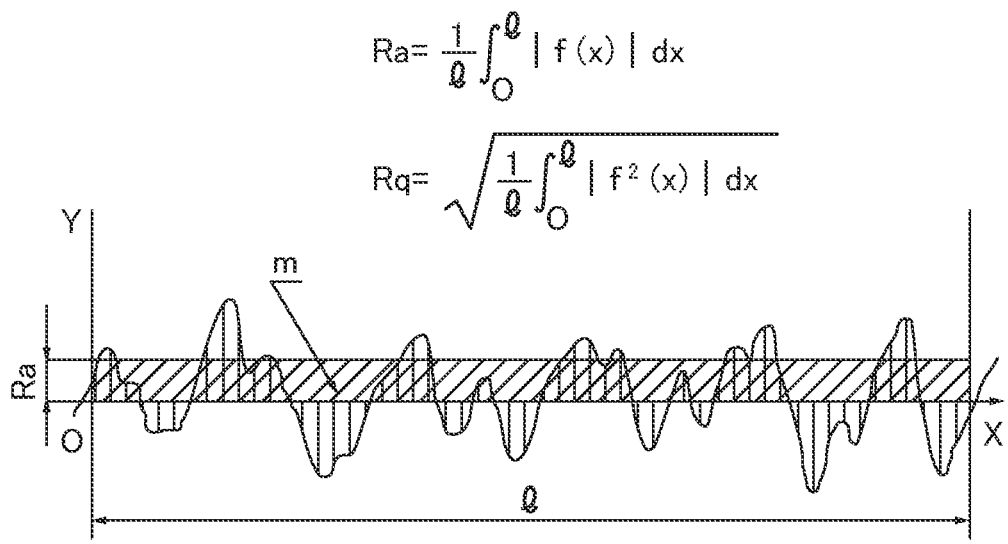
FIG. 5A is a diagram illustrating arithmetic mean roughness Ra and root mean square height Rq.

In order to measure the irregularities formed on the surface of the optical fiber ribbon 1, the arithmetic mean roughness Ra was employed as an index indicating the surface roughness of the peripheral resin portion 8 of the optical fiber 2, and the arithmetic mean roughness Ra of the peripheral resin portion 8 of the optical fiber 2 was measured. FIG. 5A is a diagram illustrating arithmetic mean roughness Ra. The arithmetic mean roughness Ra is a value (unit: μm) that is obtained by an expression indicated in FIG. 5A when the roughness curve is expressed by y=f(x) where, the roughness curve in the standard length in the direction of the average line is referred, the X axis is plotted in the direction of the referred portion, and the Y axis is plotted in the direction of the vertical magnification thereof. In this case, a compact surface roughness measuring machine (Mitutoyo Corporation compact surface roughness tester SJ-400) was used to measure the arithmetic mean roughness Ra of the peripheral resin portion 8 of the optical fiber 2 according to the standards of JIS B0601 (1994). Additionally, after the connecting portions of the optical fiber ribbon 1 were broken to separate the optical fibers individually, the optical fibers were set in the measuring machine so as to prevent the broken portions of the connecting portions 5 from being measured portions, and the arithmetic mean roughness Ra in a range with the length of 10 mm in the longitudinal direction on the surface of the peripheral resin portion 8 of the optical fiber 2 was measured. The measurement was performed in 20 portions of the optical fiber 2 (N=20), and the maximum value of the arithmetic mean roughness Ra of the surface of the peripheral resin portion 8 of the optical fiber 2 was measured.

Note that, in this case, the surface roughness of the peripheral resin portion 8 of the optical fiber 2 was measured along the longitudinal direction of the optical fiber 2 (in other words, along a generatrix of the optical fiber 2 in the shape of cylindrical surface); however, the surface roughness of the peripheral resin portion 8 of the optical fiber 2 may be measured along the ribbon-width direction perpendicular to the longitudinal direction. In this case, although the measurement result is affected by the circular periphery shape of the optical fiber 2, the surface roughness components can be extracted by removing the circular shape components from the measured curve (the roughness curve), and it is possible to measure the surface roughness (in this case, the arithmetic mean roughness Ra) based on the extracted surface roughness components. Note that, not only in the measurement of the arithmetic mean roughness Ra but also in the measurement of another surface roughness (for example, the maximum height Ry, the ten-point mean roughness Rz, the root mean square height Rq, and so on), the surface roughness may be measured along the longitudinal direction of the optical fiber 2, or the surface roughness may be measured along the ribbon-width direction perpendicular to the longitudinal direction.

For the evaluation of the optical fiber ribbon 1, the maximum transmission loss at a low temperature of −40 degrees Celsius was measured by the OTDR measurement. Note that, the maximum transmission loss in the optical fiber ribbon 1 was measured while the optical fiber ribbon 1 of 1000 m was loosely bundled by a rope to avoid the break up of the rolled bundle of the diameter of 300 mm (if the optical fiber ribbon as the measurement target is too long, the transmission loss may be increased due to an effect of the own weight of the bundle; for this reason, in this case, the maximum transmission loss in the optical fiber ribbon 1 of the length that has no effect of own weight (1000 m) was measured). With the measured wavelength of 1.55 µm, the evaluation was made such that approve is obtained when the maximum transmission loss was 0.26 dB/km or lower and disapprove is obtained when the maximum transmission loss was more than 0.26 dB/km (note that, the method of measuring and the method of evaluating the transmission loss are similar for the cases described below). The evaluation results were as indicated in the following table.

TABLE 1

| Ribbon Number | Young's Modulus | Added Amount Of The Silicone Compound [wt %] | Arithmetic Mean Roughness Ra [µm] | Maximum Transmission Loss [dB/Km] | Evaluation Result ○: Approve x: Disapprove |
|---|---|---|---|---|---|
| 1 | 1000 | 0.6 | 1.20 | 0.376 | x |
| 2 | 550 | 1.0 | 1.43 | 0.409 | x |
| 3 | 433 | 0.6 | 0.95 | 0.356 | x |
| 4 | 1250 | 0.6 | 0.41 | 0.254 | ○ |
| 5 | 1307 | 0.6 | 0.09 | 0.209 | ○ |
| 6 | 1393 | 0.0 | 0.17 | 0.206 | ○ |
| 7 | 486 | 0.8 | 0.23 | 0.202 | ○ |
| 8 | 334 | 0.8 | 0.13 | 0.205 | ○ |
| 9 | 372 | 0.8 | 0.19 | 0.202 | ○ |
| 10 | 307 | 0.8 | 0.08 | 0.192 | ○ |
| 11 | 307 | 0.8 | 0.23 | 0.190 | ○ |

As indicated in Table 1, when the arithmetic mean roughness Ra was 0.41 µm or lower, the evaluation result was "approve." Note that, even when the Young's modulus and the added amount of the silicone compound were varied, there was no correlation of the Young's modulus and the added amount of the silicone compound with the maximum transmission loss. Therefore, in order to inhibit the microbending loss in the optical fiber forming the intermittently connected optical fiber ribbon, the arithmetic mean roughness Ra of the surface of the peripheral resin portion 8 of the optical fiber 2 is desired to be 0.41 µm or lower.

<Maximum Height Ry>

Figure 5B:
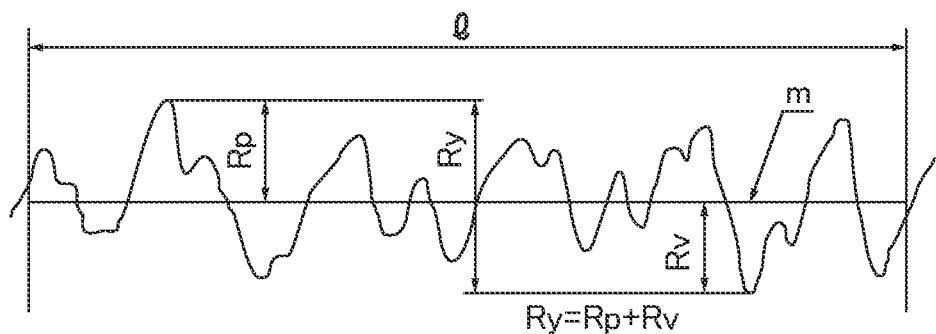
FIG. 5B is a diagram illustrating maximum height Ry.

The maximum height Ry of the peripheral resin portion 8 of the optical fiber 2 was measured while using the optical fiber ribbon 1 (the optical fiber 2) in which the above-described arithmetic mean roughness Ra was measured (that is, in this case, the maximum height Ry was employed as an index indicating the surface roughness of the peripheral resin portion 8 of the optical fiber 2). FIG. 5B is a diagram illustrating maximum height Ry. The maximum height Ry is a value (unit: µm) that is obtained by referring the roughness curve in the standard length in the direction of the average line and measuring an interval between the peak line and the valley line in the referred portion in the direction of the vertical magnification of the roughness curve. In the measurement of the maximum height Ry, the compact surface roughness measuring machine (Mitutoyo Corporation compact surface roughness tester SJ-400) was also used to measure the maximum height Ry of the peripheral resin portion 8 of the optical fiber 2 according to the standards of JIS B0601 (1994). Additionally, after the connecting portions of the optical fiber ribbon 1 were broken to separate the optical fibers individually, the optical fibers were set in the measuring machine so as to prevent the broken portions of the connecting portions 5 from being measured portions, and the maximum height Ry in a range with the length of 10 mm in the longitudinal direction on the surface of the peripheral resin portion 8 of the optical fiber 2 was measured. The measurement was performed in 20 portions of the optical fiber 2 (N=20), and the maximum value of the maximum height Ry of the surface of the peripheral resin portion 8 of the optical fiber 2 was measured. The evaluation results of the optical fiber ribbon 1 in this case were as indicated in the following table.

TABLE 2

| Ribbon Number | Young's Modulus | Added Amount Of The Silicone Compound [wt %] | Maximum Height Ry [µm] | Maximum Transmission Loss [dB/Km] | Evaluation Result ○: Approve x: Disapprove |
|---|---|---|---|---|---|
| 1 | 1000 | 0.6 | 5.5 | 0.376 | x |
| 2 | 550 | 1.0 | 6.1 | 0.409 | x |
| 3 | 433 | 0.6 | 4.3 | 0.356 | x |
| 4 | 1250 | 0.6 | 1.8 | 0.254 | ○ |
| 5 | 1307 | 0.6 | 0.8 | 0.209 | ○ |
| 6 | 1393 | 0.0 | 0.9 | 0.206 | ○ |
| 7 | 486 | 0.8 | 1.3 | 0.202 | ○ |
| 8 | 334 | 0.8 | 0.7 | 0.205 | ○ |
| 9 | 372 | 0.8 | 1.0 | 0.202 | ○ |
| 10 | 307 | 0.8 | 1.1 | 0.192 | ○ |
| 11 | 307 | 0.8 | 2.0 | 0.190 | ○ |

As indicated in Table 2, when the maximum height Ry was 2.0 µm or lower, the evaluation result was "approve." Note that, even when the Young's modulus and the added amount of the silicone compound were varied, there was no correlation of the Young's modulus and the added amount of the silicone compound with the maximum transmission loss. Therefore, in order to inhibit the microbending loss in the optical fiber forming the intermittently connected optical fiber ribbon, the maximum height Ry of the surface of the peripheral resin portion 8 of the optical fiber 2 is desired to be 2.0 µm or lower.

<Ten-Point Mean Roughness Rz>

Figure 5C:
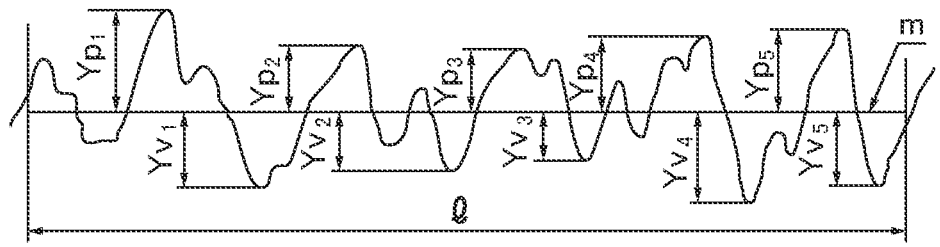
FIG. 5C is a diagram illustrating ten-point mean roughness Rz.

The ten-point mean roughness Rz of the peripheral resin portion 8 of the optical fiber 2 was measured by using the optical fiber ribbon 1 (the optical fiber 2) in which the above-described arithmetic mean roughness Ra (and the maximum height Ry) was measured (that is, in this case, the ten-point mean roughness Rz was employed as an index indicating the surface roughness of the peripheral resin portion 8 of the optical fiber 2). FIG. 5C is a diagram illustrating ten-point mean roughness Rz. The ten-point mean roughness Rz is a value (unit: µm) that is obtained by referring the roughness curve in the standard length in the direction of the average line and adding an average value of absolute values of the attitudes of the highest peak to the fifth-highest peak (Yp1 to Yp5) and an average value of absolute values of the valleys of the lowest valley to the fifth-lowest valley (Yv1 to Yv5), which are measured from the average line of the extracted portion in the direction of the vertical magnification. In the measurement of the ten-point mean roughness Rz, the compact surface roughness measuring machine (Mitutoyo Corporation compact surface roughness tester SJ-400) was also used to measure the ten-point mean roughness Rz of the peripheral resin portion 8 of the optical fiber 2 according to the standards of JIS B0601 (1994). Additionally, after the connecting portions of the optical fiber ribbon 1 were broken to separate the optical fibers individually, the optical fibers were set in the measuring machine so as to prevent the broken portions of the connecting portions 5 from being measured portions, and the ten-point mean roughness Rz in a range with the length of 10 mm in the longitudinal direction on the surface of the peripheral resin portion 8 of the optical fiber 2 was measured. The measurement was performed in 20 portions of the optical fiber 2 (N=20), and the maximum value of the ten-point mean roughness Rz of the surface of the peripheral resin portion 8 of the optical fiber 2 was measured. The evaluation results of the optical fiber ribbon 1 in this case were as indicated in the following table.

TABLE 3

| Ribbon Number | Young's Modulus | Added Amount Of The Silicone Compound [wt %] | Ten-Point Mean Roughness Rz [μm] | Maximum Transmission Loss [dB/Km] | Evaluation Result ○: Approve x: Disapprove |
|---|---|---|---|---|---|
| 1 | 1000 | 0.6 | 4.4 | 0.376 | x |
| 2 | 550 | 1.0 | 4.8 | 0.409 | x |
| 3 | 433 | 0.6 | 3.1 | 0.356 | x |
| 4 | 1250 | 0.6 | 1.3 | 0.254 | ○ |
| 5 | 1307 | 0.6 | 0.5 | 0.209 | ○ |
| 6 | 1393 | 0.0 | 0.8 | 0.206 | ○ |
| 7 | 486 | 0.8 | 1.0 | 0.202 | ○ |
| 8 | 334 | 0.8 | 0.5 | 0.205 | ○ |
| 9 | 372 | 0.8 | 0.8 | 0.202 | ○ |
| 10 | 307 | 0.8 | 0.9 | 0.192 | ○ |
| 11 | 307 | 0.8 | 1.4 | 0.190 | ○ |

As indicated in Table 3, when the ten-point mean roughness Rz was 1.4 μm or lower, the evaluation result was "approve." Note that, even when the Young's modulus and the added amount of the silicone compound were varied, there was no correlation of the Young's modulus and the added amount of the silicone compound with the maximum transmission loss. Therefore, in order to inhibit the microbending loss in the optical fiber forming the intermittently connected optical fiber ribbon, the ten-point mean roughness Rz of the surface of the peripheral resin portion 8 of the optical fiber 2 is desired to be 1.4 μm or lower.

<Root Mean Square Height Rq>

The root mean square height Rq of the peripheral resin portion 8 of the optical fiber 2 was measured by using the optical fiber ribbon 1 (the optical fiber 2) in which the above-described arithmetic mean roughness Ra and the like were measured (that is, in this case, the root mean square height Rq was employed as an index indicating the surface roughness of the peripheral resin portion 8 of the optical fiber 2). The root mean square height Rq is a value (unit: μm) representing the root mean square in the standard length based on the expression indicated in FIG. 5A and is a value indicating the standard deviation of the surface roughness. In the measurement of the root mean square height Rq, the compact surface roughness measuring machine (Mitutoyo Corporation compact surface roughness tester SJ-400) was also used to measure the root mean square height Rq of the peripheral resin portion 8 of the optical fiber 2 according to the standards of JIS B0601. Additionally, after the connecting portions of the optical fiber ribbon 1 were broken to separate the optical fibers individually, the optical fibers were set in the measuring machine so as to prevent the broken portions of the connecting portions 5 from being measured portions, and the root mean square height Rq in a range with the length of 10 mm in the longitudinal direction on the surface of the peripheral resin portion 8 of the optical fiber 2 was measured. The measurement was performed in 20 portions of the optical fiber 2 (N=20), and the maximum value of the root mean square height Rq of the surface of the peripheral resin portion 8 of the optical fiber 2 was measured. The evaluation results of the optical fiber ribbon 1 in this case were as indicated in the following table.

TABLE 4

| Ribbon Number | Young's Modulus | Added Amount Of The Silicone Compound [wt %] | Root Mean Square Height Rq [μm] | Maximum Transmission Loss [dB/Km] | Evaluation Result ○: Approve x: Disapprove |
|---|---|---|---|---|---|
| 1 | 1000 | 0.6 | 1.46 | 0.376 | x |
| 2 | 550 | 1.0 | 1.69 | 0.409 | x |
| 3 | 433 | 0.6 | 1.13 | 0.356 | x |
| 4 | 1250 | 0.6 | 0.42 | 0.254 | ○ |
| 5 | 1307 | 0.6 | 0.12 | 0.209 | ○ |
| 6 | 1393 | 0.0 | 0.20 | 0.206 | ○ |
| 7 | 486 | 0.8 | 0.29 | 0.202 | ○ |
| 8 | 334 | 0.8 | 0.15 | 0.205 | ○ |
| 9 | 372 | 0.8 | 0.25 | 0.202 | ○ |
| 10 | 307 | 0.8 | 0.13 | 0.192 | ○ |
| 11 | 307 | 0.8 | 0.33 | 0.190 | ○ |

As indicated in Table 4, when the root mean square height Rq was 0.42 μm or lower, the evaluation result was "approve." Note that, even when the Young's modulus and the added amount of the silicone compound were varied, there was no correlation of the Young's modulus and the added amount of the silicone compound with the maximum transmission loss. Therefore, in order to inhibit the microbending loss in the optical fiber forming the intermittently connected optical fiber ribbon, the root mean square height Rq of the surface of the peripheral resin portion 8 of the optical fiber 2 is desired to be 0.42 μm or lower.

FIG. 6A is a diagram illustrating an intermittently connected optical fiber ribbon 1 according to one or more embodiments. FIG. 6B is a sectional view taken along X2-X2 in FIG. 6A.

In one or more embodiments, the optical fiber ribbon 1 is also an optical fiber ribbon in which the multiple optical fibers 2 are in parallel and intermittently connected. In one or more embodiments, the ribbon forming material portion 9 is formed in the shape of a band having a width L by applying the coupling agent on the ribbon surface (a surface parallel in the longitudinal direction and in the width direction) of the optical fiber ribbon 1 in the shape of a band and curing the coupling agent. The connecting portion 5 is formed between two optical fibers 2 with the coupling agent being applied and cured between the two optical fibers 2. Additionally, the peripheral resin portion 8 is formed on the periphery of the optical fiber 2 with the coupling agent being applied and cured on the periphery of the optical fiber 2. The multiple connecting portions 5 connecting adjacent two optical fibers 2 are intermittently arranged in the longitudinal direction in one or more embodiments as well. Moreover, the multiple connecting portions 5 of the intermittently connected optical fiber ribbon 1 are intermittently arranged two-dimensionally in the longitudinal direction and the ribbon-width direction. The non-connecting portion 7 is formed between the connecting portion 5 and the connecting portion 5 which are intermittently formed in the longitudinal direction. In the non-connecting portions 7, the adjacent two optical fibers are not restrained with each other in one or more embodiments as well.

The peripheral resin portion 8 in one or more embodiments is formed on a part of the periphery of the optical fiber 2 (in contrast, the peripheral resin portion 8 in the above-described embodiments is formed on the entire periphery of the optical fiber 2). Additionally, the peripheral resin portion 8 in one or more embodiments is formed on a part of the optical fiber 2 in the longitudinal direction (in contrast, the peripheral resin portion 8 in one or more above-described embodiments is formed on the entire area of the optical fiber 2 in the longitudinal direction).

When a surface of the optical fiber ribbon 1 is rough in the portion in which the peripheral resin portion 8 is formed, the microbending loss is increased due to the irregularities formed on the surface of the optical fiber ribbon 1 in one or more embodiments as well. In order to inhibit such microbending loss, it is desired in the one or more embodiments as well for the irregularities on the surface of the optical fiber ribbon 1 to be small as with the above-described embodiments. Therefore, in order to inhibit the microbending loss in the optical fiber forming the intermittently connected optical fiber ribbon, the arithmetic mean roughness Ra of the peripheral resin portion 8 of the optical fiber 2 is desired to be 0.41 μm or lower in one or more embodiments as well. Additionally, in order to inhibit the similar microbending loss, the maximum height Ry of the peripheral resin portion 8 of the optical fiber 2 is desired to be 2.0 μm or lower. Moreover, in order to inhibit the similar microbending loss, the ten-point mean roughness Rz of the peripheral resin portion 8 of the optical fiber 2 is desired to be 1.4 μm or lower. Furthermore, in order to inhibit the similar microbending loss, the root mean square height Rq of the peripheral resin portion 8 of the optical fiber 2 is desired to be 0.42 μm or lower.

Note that, in above-described embodiments, the peripheral resin portion 8 is formed of the ribbon forming material portion (the resin forming the connecting portion 5). However, even when the peripheral resin portion is not the ribbon forming material portion 9, if a surface of the peripheral resin portion formed on the periphery of the optical fiber 2 is rough, the microbending loss is increased due to the irregularities. For this reason, the surface roughness of the peripheral resin portion of the optical fiber 2 is desired to be a predetermined value or lower as with the above-described embodiments in the case where the peripheral resin portion is not the ribbon forming material portion 9 as well.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 optical fiber ribbon
2 optical fiber
2A optical fiber bare wire
2B coating layer
2C colored layer
3 fiber pair
5 connecting portion
7 non-connecting portion
8 peripheral resin portion
9 ribbon forming material portion
10 fiber supply device
20 printing apparatus
30 coloring apparatus
40 ribbon forming apparatus
41 application device
42 removal device
421 rotary blade
421A recessed portion
43 light source
43A light source for preliminary curing
43B light source for final curing
50 bobbin

What is claimed is:

1. An optical fiber ribbon, comprising:
  optical fibers disposed side by side in a predetermined direction; and
  connecting portions that connect two adjacent ones of the optical fibers, wherein
  a peripheral resin portion is formed on a periphery of the optical fibers,
  an arithmetic mean roughness Ra of a surface of the peripheral resin portion is 0.41 μm or lower,
  a ten-point mean roughness Rz of a surface of the peripheral resin portion is 1.4 μm or lower, and
  the arithmetic mean roughness Ra of the peripheral resin portion is 0.41 μm or lower and the ten-point mean roughness Rz is 1.4 μm or lower when the connecting portions of the optical fiber ribbon are broken to separate the optical fibers and thereafter the surface of the peripheral resin portion is measured along a longitudinal direction of the optical fibers so as to prevent the broken portions of the connecting portions from being measured portions.

2. The optical fiber ribbon according to claim 1, wherein a maximum height Ry of a surface of the peripheral resin portion is 2.0 μm or lower.

3. The optical fiber ribbon according to claim 1, wherein a root mean square height Rq of a surface of the peripheral resin portion is 0.42 μm or lower.

4. The optical fiber ribbon according to claim 1, wherein the peripheral resin portion is formed of resin forming the connecting portions.

5. The optical fiber ribbon according to claim 4, wherein a silicone compound is added to the resin.

6. The optical fiber ribbon according to claim 1, wherein the connecting portions intermittently connect two adjacent ones of the optical fibers.

7. The optical fiber ribbon according to claim 1, wherein the arithmetic mean roughness Ra of the peripheral resin portion is 0.41 μm or lower and the ten-point mean roughness Rz is 1.4 μm or lower when a range with a length of 10 mm in a longitudinal direction on the surface of the peripheral resin portion is measured.

8. The optical fiber ribbon according to claim 1, wherein the peripheral resin portion is formed on an entire periphery of the optical fibers in an entire area of the optical fibers in a longitudinal direction, and
  the arithmetic mean roughness Ra of the peripheral resin portion is 0.41 μm or lower and the ten-point mean roughness Rz is 1.4 μm or lower.

9. The optical fiber ribbon according to claim 1, wherein the peripheral resin portion is formed on a part of a periphery of the optical fibers in a part of a longitudinal direction, and
  the arithmetic mean roughness Ra of the peripheral resin portion is 0.41 μm or lower and the ten-point mean roughness Rz is 1.4 μm or lower.

10. An optical fiber ribbon, comprising:
optical fibers disposed side by side in a predetermined direction; and
connecting portions that connect two adjacent ones of the optical fibers, wherein
a peripheral resin portion is formed on a periphery of the optical fibers,
an arithmetic mean roughness Ra of a surface of the peripheral resin portion is 0.41 μm or lower,
a ten-point mean roughness Rz of a surface of the peripheral resin portion is 1.4 μm or lower,
the arithmetic mean roughness Ra of the peripheral resin portion based on components that are extracted by removing components of a circular periphery shape of the optical fibers from a measurement result of measuring of the surface of the peripheral resin portion along a ribbon width direction is 0.41 μm or lower, and
the ten-point mean roughness Rz of the peripheral resin portion based on components that are extracted by removing components of a circular periphery shape of the optical fibers from a measurement result of measuring of the surface of the peripheral resin portion along a ribbon width direction is 1.4 μm or lower.

11. The optical fiber ribbon according to claim 10, wherein
a maximum height Ry of a surface of the peripheral resin portion is 2.0 μm or lower.

12. The optical fiber ribbon according to claim 10, wherein
a root mean square height Rq of a surface of the peripheral resin portion is 0.42 μm or lower.

13. The optical fiber ribbon according to claim 10, wherein
the peripheral resin portion is formed of resin forming the connecting portions.

14. The optical fiber ribbon according to claim 13, wherein
a silicone compound is added to the resin.

15. The optical fiber ribbon according to claim 10, wherein
the connecting portions intermittently connect two adjacent ones of the optical fibers.

16. The optical fiber ribbon according to claim 10, wherein
the arithmetic mean roughness Ra of the peripheral resin portion is 0.41 μm or lower and the ten-point mean roughness Rz is 1.4 μm or lower when a range with a length of 10 mm in a longitudinal direction on the surface of the peripheral resin portion is measured.

17. The optical fiber ribbon according to claim 10, wherein
the peripheral resin portion is formed on an entire periphery of the optical fibers in an entire area of the optical fibers in a longitudinal direction, and
the arithmetic mean roughness Ra of the peripheral resin portion is 0.41 μm or lower and the ten-point mean roughness Rz is 1.4 μm or lower.

18. The optical fiber ribbon according to claim 10, wherein
the peripheral resin portion is formed on a part of a periphery of the optical fibers in a part of a longitudinal direction, and
the arithmetic mean roughness Ra of the peripheral resin portion is 0.41 μm or lower and the ten-point mean roughness Rz is 1.4 μm or lower.

* * * * *